United States Patent
Gerhard

(10) Patent No.: US 7,338,243 B2
(45) Date of Patent: Mar. 4, 2008

(54) THREAD-CUTTING SCREW

(75) Inventor: Anton Gerhard, Nürnberg (DE)

(73) Assignee: Toge-Dübel A. Gerhard KG, Nürnberg (DE)

( * ) Notice: Subject to any disclaimer, the term of this patent is extended or adjusted under 35 U.S.C. 154(b) by 356 days.

(21) Appl. No.: 10/545,422

(22) PCT Filed: Feb. 18, 2003

(86) PCT No.: PCT/EP03/01609

§ 371 (c)(1),
(2), (4) Date: Aug. 12, 2005

(87) PCT Pub. No.: WO2004/074697

PCT Pub. Date: Sep. 2, 2004

(65) Prior Publication Data

US 2006/0193713 A1    Aug. 31, 2006

(51) Int. Cl.
*F16B 25/10* (2006.01)

(52) U.S. Cl. ............ 411/387.4; 411/901; 411/902; 411/311; 411/411; 411/304; 411/387.8; 408/230

(58) Field of Classification Search ............ 411/384, 411/311, 411, 304, 901, 902, 387.4, 387; 408/230
See application file for complete search history.

(56) References Cited

U.S. PATENT DOCUMENTS

| | | | | |
|---|---|---|---|---|
| 3,884,117 A * | 5/1975 | Eager | .................. | 411/387.8 |
| 4,824,314 A * | 4/1989 | Stencel | ............... | 411/378 |
| 5,127,783 A * | 7/1992 | Moghe et al. | .............. | 411/411 |
| 5,205,466 A * | 4/1993 | Ker | ............... | 228/125 |
| 5,292,215 A * | 3/1994 | Roberts, III | ............... | 411/424 |
| 5,382,318 A * | 1/1995 | Tahara et al. | ............... | 216/100 |
| 6,086,302 A * | 7/2000 | Gerhard | .................. | 411/387.4 |
| 6,321,614 B1 * | 11/2001 | Blaurock et al. | ............. | 74/441 |
| 6,386,810 B1 * | 5/2002 | Onoe | .................. | 411/411 |
| 6,514,026 B1 * | 2/2003 | Gerhard | .................. | 411/387.4 |
| 6,599,072 B1 * | 7/2003 | Gerhard | .................. | 411/387.4 |
| 6,644,903 B1 * | 11/2003 | Arand | ............... | 411/352 |
| 6,874,986 B2 * | 4/2005 | Koppel et al. | ............. | 411/386 |
| 7,014,409 B2 * | 3/2006 | Allaart et al. | ............... | 411/487 |
| 2001/0053317 A1 | 12/2001 | Unsworth et al. | | |

(Continued)

FOREIGN PATENT DOCUMENTS

EP    1 129 297 B1    4/2002

(Continued)

*Primary Examiner*—Katherine Mitchell
(74) *Attorney, Agent, or Firm*—Browdy and Neimark, PLLC

(57) ABSTRACT

A thread-cutting screw (1) serves for being screwed into the bore-hole wall (1*a*) of a bore-hole (1*b*). It comprises a substantially cylindrical core (2) of metal which has a central longitudinal axis (4), a thread (5) forming one piece with the core (2), and at least one cutting element (6, 7), disposed within the thread (5), for cutting engagement with the bore-hole wall. The core (2) consists of a metal of a carbon content between 0 and 0.5 percent by weight. The at least one cutting element (6, 7) is fixedly connected with the core (2), constituting a welded structure of a metal with a carbon content greater than 0.8 percent by weight. Being safely connected to the core (2), the cutting elements (6, 7) offer efficient cutting operation, with any risk of brittle fracture of the screw (1) being precluded.

20 Claims, 3 Drawing Sheets

U.S. PATENT DOCUMENTS

| | | | |
|---|---|---|---|
| 2003/0147717 A1* | 8/2003 | Koppel et al. | 411/387.1 |
| 2006/0120826 A1* | 6/2006 | Wieser et al. | 411/387.4 |
| 2006/0193713 A1* | 8/2006 | Gerhard | 411/387.4 |
| 2007/0122251 A1* | 5/2007 | Friederich et al. | 411/424 |

FOREIGN PATENT DOCUMENTS

| | | |
|---|---|---|
| WO | WO 00/29754 A1 | 5/2000 |
| WO | WO 01/98672 A1 | 12/2001 |

* cited by examiner

THREAD-CUTTING SCREW

The invention relates to a thread-cutting screw according to the preamble of claim 1.

A screw of the generic type is known for example from EP 1 129 297 A (corresponding to U.S. Ser. No. 09/831,707), where cutting elements are provided in the form of cutting pegs inserted in the thread of the screw. That kind of screws possess excellent cutting action, however they are comparatively complicated to manufacture, in particular regarding the connection of the inserted cutting pegs with the core.

Additionally thread-cutting screws have become known by public prior use, which are carburized for improved strength i.e., their carbon content is augmented, after which they are hardened. Practice has shown that that kind of screws tend to brittle fracture. Hydrogen that penetrates the core and damages the micro-structure of the screw material is considered to be responsible.

It is an object of the present invention to improve a screw of the type mentioned at the outset in such a way that uniting the cutting elements and the core is less complicated in terms of manufacturing requirements, with the risk of brittle fracture that occurs in other known thread-cutting screws being simultaneously avoided.

According to the invention, this object is attained by a screw with the features specified in the characterizing part of claim 1.

The invention proceeds from the idea that the at least one cutting element may be embodied as a welded structure, which enables a comparatively simple connection to be produced by the cutting element and the screw being united by welding, this connection simultaneously complying with the demands made on cutting when a screw is driven into a concrete wall. The equipment of the screw with cutting elements of higher carbon content being locally distinctly defined, any prior art carburization can be dropped. Surprisingly tests have shown that this helps avoid the risk of brittle fracture. A reason for this is seen in the fact that welding on the cutting elements will lead to locally distinctly defined heating of the screw, which obviously precludes hydrogen-induced fracturing. Core material of a carbon content in a range between 0 and 0.5 percent by weight can be formed and worked at a reasonable expense. Cutting elements of a material of a carbon content above 0.8 percent by weight possess a hardness sufficient for thread cutting.

Formable treatment of core materials according to claims 2 is the better, the lower the carbon component. Materials without a carbon content, for example pure metals such as aluminum or brass, are also conceivable as core material.

Cutting elements according to claim 3 have a hardness that favours cutting the more, the higher the carbon content.

An arrangement and number of cutting elements according to claims 4 and 5 has proved sufficient for safe cutting action of the screw.

A pilot cutting element according to claim 6 ensures controlled cutting operation.

A pilot cutting element according to claim 7 is especially solid.

Projections according to claims 8 and 9 have given a good account of themselves as being an excellent compromise between good cutting action of the cutting elements on the one hand and tight fit of the screw after cutting on the other hand. However these projections are not forcibly needed.

Quenching and tempering subsequent to the manufacture and shaping of the core material according to claim 10 can improve the cutting qualities of the screw once again. However, such a subsequent quenching and tempering process is not forcibly necessary for all the kinds of applications and designs. Welding the cutting elements on a quenched and tempered core material does not result in any modification of the quenched and tempered material structure.

Details of the invention will become apparent from the ensuing description of exemplary embodiments, taken in conjunction with the drawing, in which.

Figure 1:
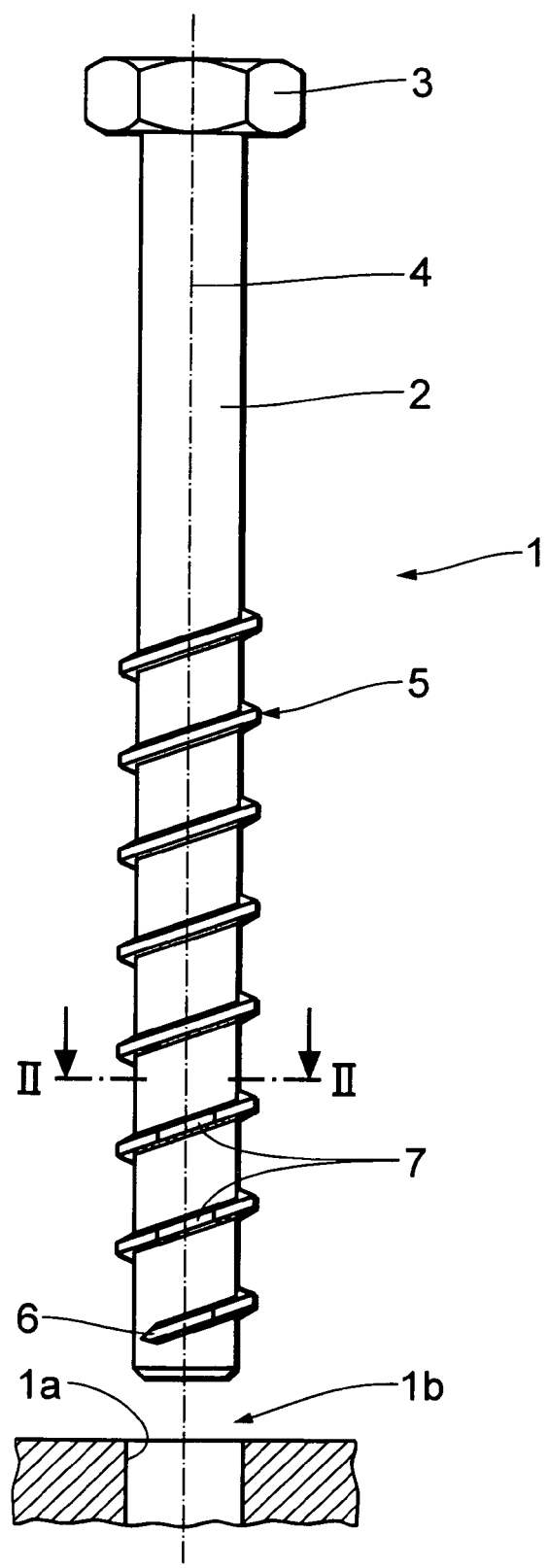
FIG. 1 is a side view of a screw.

The thread-cutting screw 1 seen in FIG. 1 is a concrete screw suitable in particular for being screwed into bore-hole wall 1*a* of a bore hole 1*b*. The screw 1 has a cylindrical core 2 of constructional steel with a carbon component in the range of 0.18 percent by weight. Steels of that kind are known. The screw 1 has a core diameter appropriate for a bore-hole diameter of 10 mm. Other diameters of up to 30 mm of core diameter are possible. A hexagonal head 3 is molded on one end of the core 2 in a manner known per se. The core has a central longitudinal axis 4 which is roughly outlined by dashes in FIG. 1.

From the end of the screw 1 opposite the head 3 as far as approximately centrally between the two ends, the core 2 comprises a thread 5, both forming one piece. The thread 5 is a trapezoidal thread (see FIG. 3).

The portion of the thread 5 that leads when the screw 1 is driven into the bore hole is configured as a pilot cutting element 6 which—in the same way as further cutting elements 7 that are provided in the course of the three flights, following the pilot cutting element 6, of the thread 5—is embodied as a welded structure of high-speed steel with a carbon content that exceeds 0.8 percent by weight, in the present case with a carbon content of 0.85 percent by weight. As compared to the other cutting elements 7, the pilot cutting element 6 has a greater length along the thread 5, which is seen in FIG. 1. When screwed in, the pilot cutting element 6 immediately produces a thread of a defined pitch in the bore-hole wall, which enables the screw 1 that is driven in to be guided precisely. The job of the pilot cutting element 6 can be compared to that of the tip of a wood screw. Three cutting elements 7 per flight are disposed downstream of the pilot cutting element 6, with only the first three flights of the thread 5 having cutting elements 7 so that there is a total of nine cutting elements 7, two of which being seen in FIG. 1.

The cutting elements 6, 7 are fitted by welding into the thread 5 for it to be continued harmoniously. The cutting elements 6, 7 slightly project over the rest of the thread 5 in the axial as well as the radial direction of the central longitudinal axis 4.

The projections mentioned above are excellently illustrated in FIGS. 2 and 3. The cutting element 7 is approximately cup-shaped as a result of the welding job when it is mounted on the thread 5, with the bottom of the cup of the cutting element 7 penetrating into the core 2. The cutting element 7 projects over flanks 8 and a front wall 9 of the thread 5. The radial projection of the cutting element 7 over the thread 5 is denoted by a in FIG. 2. In the case of the screw 1, the projection a of the cutting element amounts to 5 percent of the depth of thread.

Figure 2:
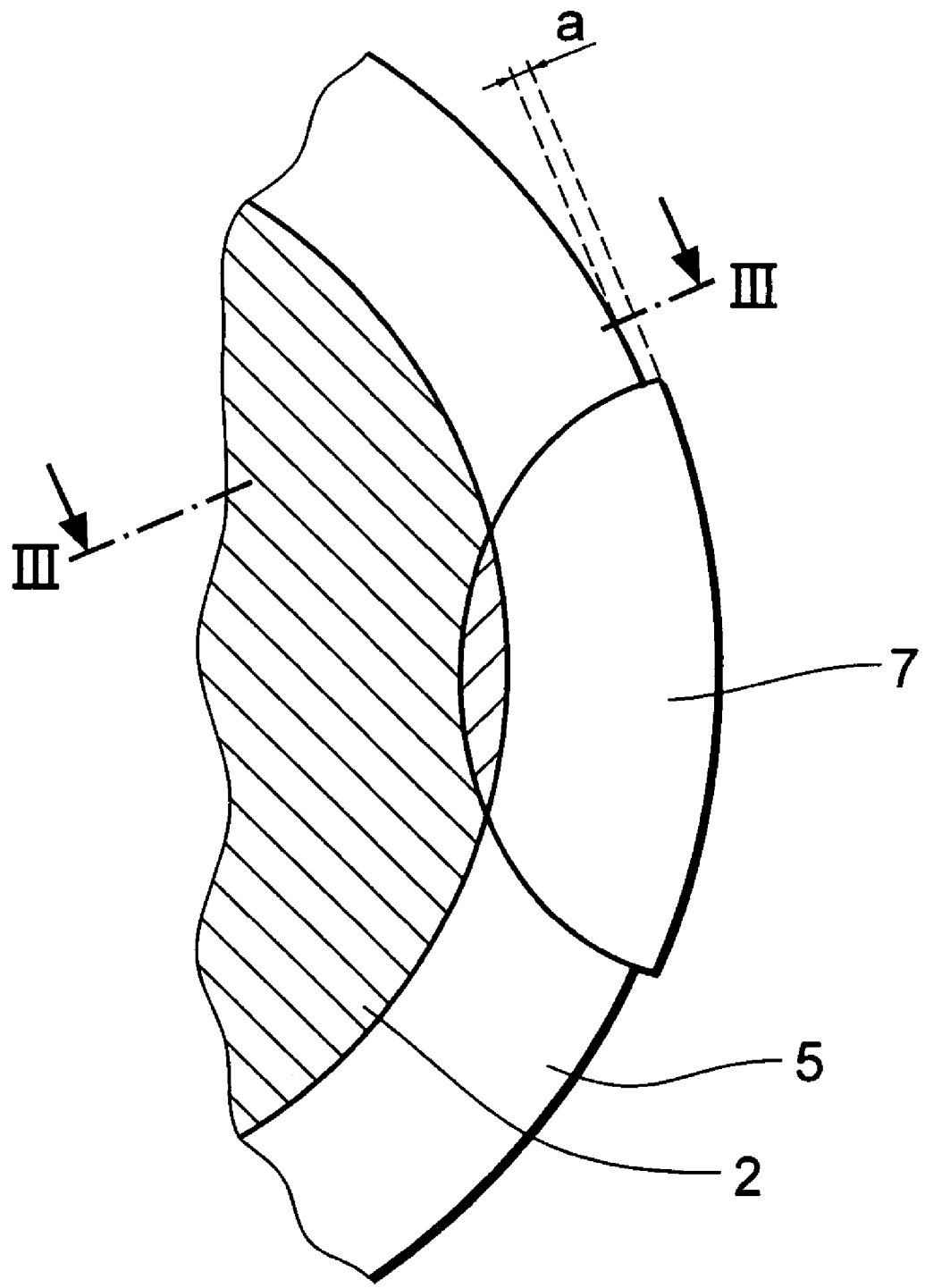
FIG. 2 is a broken sectional view, on an enlarged scale, in accordance with the line II-II of FIGS. 1 and 3.
Figure 3:
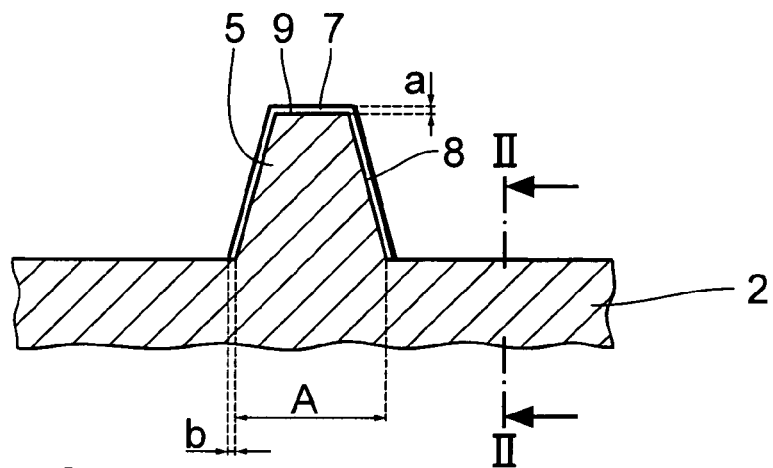
FIG. 3 is a broken sectional view, on an enlarged scale, in accordance with the line III-III of FIG. 2.

FIG. 3 is a partial sectional view of the screw 1, including the central longitudinal axis 4, with the cutting plane being in direct vicinity to the cutting element 7 of FIG. 2. Apart from the radial projection a, FIG. 3 also illustrates the axial projection b of the cutting element 7 over the thread 5. In FIG. 3 the axial projection b is plotted in the direction of a distance A that flanks 8 of the thread 5 have from each other upon passing into the core 2 and denoted by b. In the case of the screw 1, the projection b amounts to 5 percent of the distance A.

In the case of the thread 5, the depth of thread and the distance A amount to approximately 2 mm. The projections a, b therefore amount to approximately 0.1 mm. Other projections of for instance 0.2 mm or 0.3 mm may be selected, depending on the core diameter and depth of thread.

Other steels may be used for the core 2, having for example a carbon content of less than 0.5 percent by weight, for example 0.42 percent by weight; or of less than 0.35 percent by weight, for example 0.30 percent by weight; or of less than 0.25 percent by weight, for example 0.22 percent by weight; or of less than 0.2 percent by weight, for example 0.18 percent by weight; or of less than 0.15 percent by weight, for example 0.12 percent by weight. Depending on the demands made on the formability of the material for production of the core 2 and the thread 5 prior to the cutting elements 6, 7 being attached, a steel may be selected which, by its carbon content, complies with the respective demands.

Materials without carbon content can also be used as core material, for example aluminum or brass.

As regards the material for the cutting elements 6, 7, other steels may be used, having a carbon content which exceeds 1.0 percent by weight, for example 1.2 percent by weight; or which exceeds 1.5 percent by weight, for example 1.8, 2.0 or 2.5 percent by weight. The high the carbon content, the harder are the cutting elements 6, 7.

Alternative screws are conceivable, using fewer cutting elements 7, for example four cutting elements or six cutting elements.

In alternative screws, the cutting elements 7 may pass along a smaller number of flights, for example only the last two flights. In yet another design of the screw, it is conceivable that the cutting elements 7 pass along the last five flights.

The number and distribution of the cutting elements 6, 7 along the thread 5 depend on the geometry of the screw 1, the thread 5 and the material of the bore-hole wall. In particular in the case of a greater core diameter, provision may be made for several cutting elements 6, 7 per flight.

Manufacture of the screw 1 is as follows: At first the core 2 is being preformed by rolling and pressing, having a raw thread molded on integrally and a head 3. The core material is being quenched and tempered, which can be dropped in the case of screws of greater diameter, for example screws of a core diameter for a bore hole greater than 16 mm. After the thread 5 has been formed, the cutting elements 6, 7 are being incorporated in the thread 5 by welding.

Figure 4:
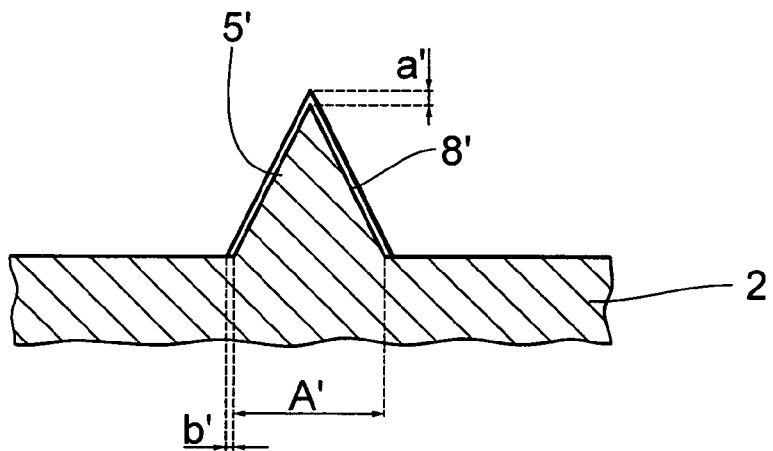
FIG. 4 is a sectional view, similar to FIG. 3, of another embodiment of the screw.
Figure 5:
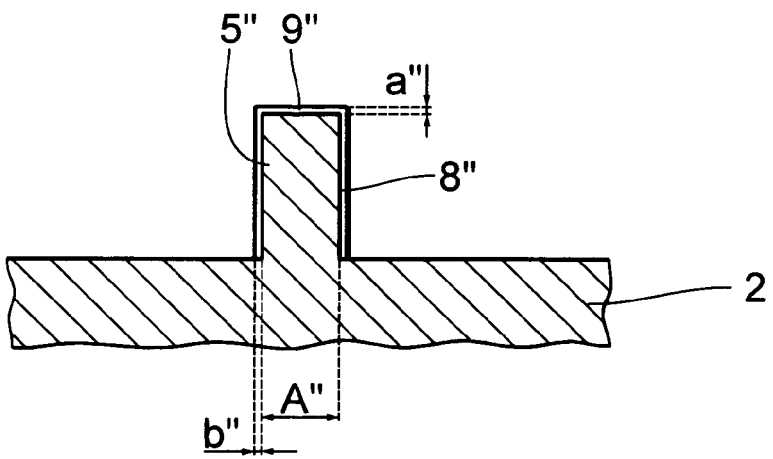
FIG. 5 is a sectional view, similar to FIG. 3, of another embodiment of the screw.

FIGS. 4 and 5 illustrate further embodiments of screws according to the invention. Elements that correspond to those described with reference to FIGS. 1 to 3 have the same reference numerals provided with a prime and will not be explained in detail again.

FIG. 4 shows a thread 5' in the form of a triangular thread. The cutting element 7 projects over the two flanks 8' of the triangle formed by the thread 5'. The projection, perpendicular to the central longitudinal axis 4, of the cutting element 7 over the tip of the thread 5' is designated by a'.

FIG. 5 shows another embodiment with a thread 5" in the form of a flat thread. The cutting element 7 projects over the thread flanks 8", parallel to each other in this case, and over the front wall 9".

The invention claimed is:

1. A thread-cutting screw (1),
   suitable for use as a concrete screw, for being screwed into the bore-hole wall (1a) of a bore hole (1b), comprising
   a substantially cylindrical core (2) of metal with a central longitudinal axis (4);
   a thread (5, 5', 5") which forms one piece with the core (2);
   at least one cutting element (6, 7) which is disposed within the thread (5, 5', 5") for cutting engagement with the bore-hole wall,
      with the core (2) consisting of a metal having a carbon content in a range between greater than 0 and 0.5 percent by weight, and
      with the at least one cutting element (6, 7) being fixedly connected to the core (2);
   wherein
   the at least one cutting element (6, 7) is a welded structure, united with the thread (5, 5', 5"), of a metal with a carbon content that exceeds 0.8 percent by weight.

2. A screw according to claim 1, wherein the core (2) consists of a metal with a carbon content of less than 0.35 percent by weight.

3. A screw according to claim 2, wherein the core (2) consists of a metal with a carbon content of less than 0.25 percent by weight.

4. A screw according to claim 2, wherein the core (2) consists of a metal with a carbon content of less than 0.2 percent by weight.

5. A screw according to claim 2, wherein the core (2) consists of a metal with a carbon content of less than 0.15 percent by weight.

6. A screw according to claim 2, wherein the core (2) consists of a metal with a carbon content of less than 0.1 percent by weight.

7. A screw according to claim 1, wherein the at least one cutting element (6, 7) which is disposed within the thread (5, 5', 5") consists of a metal with a carbon content exceeding 1.0 percent by weight.

8. A screw according to claim 7, wherein the at least one cutting element (6, 7) which is disposed within the thread (5, 5', 5") consists of a metal with a carbon content exceeding 1.5 percent by weight.

9. A screw according to claim 7, wherein the at least one cutting element (6, 7) which is disposed within the thread (5, 5', 5") consists of a metal with a carbon content exceeding 2.0 percent by weight.

10. A screw according to claim 1, wherein the at least one cutting element (6, 7) comprises a plurality of cutting elements which are disposed only on the last five flights of the thread (5, 5', 5").

11. A screw according to claim 10, wherein the at least one cutting element (6, 7) comprises a plurality of cutting elements which are disposed only on the last three flights of the thread (5, 5', 5").

12. A screw according to claim 10,
   wherein the at least one cutting element (6, 7) comprises a plurality of cutting elements which are disposed only on the last three flights of the thread (5, 5', 5").

13. A screw according to claim 1,
wherein provision is made for the at least one cutting element (6, 7) to comprise a total of less than 15 cutting elements.

14. A screw according to claim 13, wherein provision is made for at least one cutting element (6, 7) to total less than 10 cutting elements (6, 7).

15. A screw according to claim 13, wherein provision is made for at least one cutting element (6, 7) to total less than 5 cutting elements (6, 7).

16. A screw according to claim 1, comprising a pilot cutting element (6) included in the at least one cutting element (6, 7), said pilot cutting element located at the end of the thread (5, 5', 5") that is allocated to the cutting end of the screw (1).

17. A screw according to claim 16, wherein the pilot cutting element (6), as compared to the other at least one cutting elements (7), has a greater length along the thread (5, 5', 5").

18. A screw according to claim 1, wherein the at least one cutting element (6, 7) projects over the thread (5, 5', 5") radially of the central longitudinal axis (4), with the projection (a, a', a") of the cutting element being maximally 15 percent of the depth of thread.

19. A screw according to claim 1, wherein the at least one cutting element (6, 7) projects over the thread (5, 5', 5") axially in the direction of the central longitudinal axis (4), with the projection (b, b', b") of the cutting element (6, 7) amounting to maximally 15 percent of the distance (A, A', A") that the flanks (8, 8', 8") of the thread (5, 5', 5") have from each other when passing into the core (2).

20. A screw according to claim 1, wherein the core (2) and/or the at least one cutting element (6, 7) consist of a material subsequently quenched and tempered.

\* \* \* \* \*